March 31, 1964 R. H. SCHLIDT ETAL 3,126,821
DEVICE FOR SANITARILY HANDLING A HALF-SLICE OF CITRUS FRUIT
AND CONTROLLING THE EXTRACTION OF JUICE THEREFROM
Filed Dec. 20, 1960
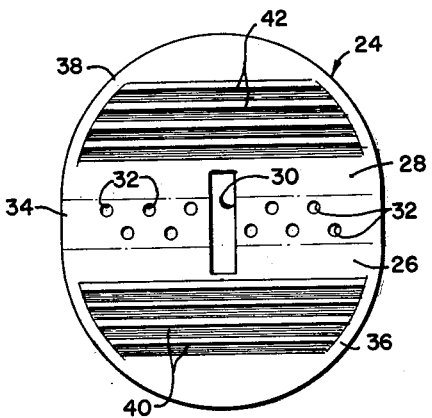
Fig. 2
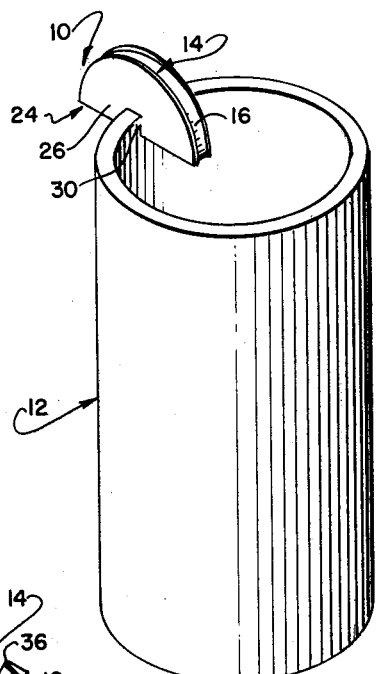
Fig. 1
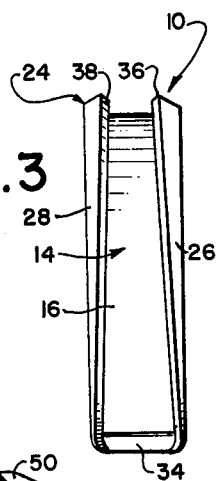
Fig. 3
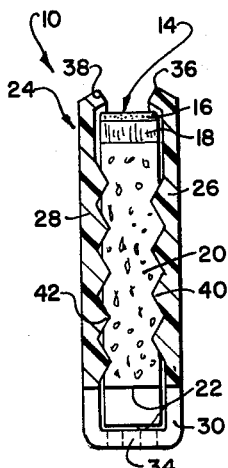
Fig. 4
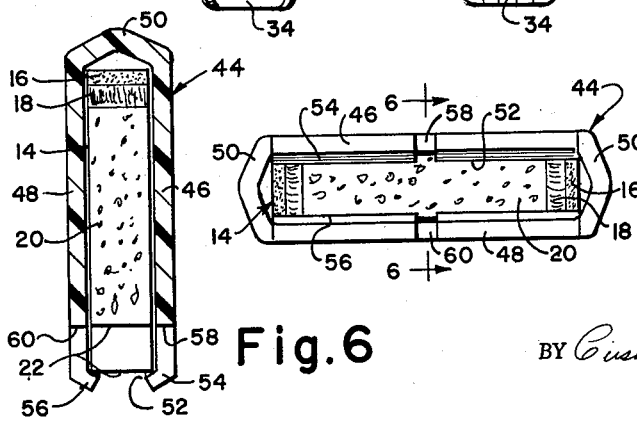
Fig. 5
Fig. 6
INVENTOR
RUDOLF H. SCHLIDT
FRITZ K. PAULI
BY Cushman, Darby & Cushman
ATTORNEY United States Patent Office 3,126,821
Patented Mar. 31, 1964

1

3,126,821
DEVICE FOR SANITARILY HANDLING A HALF-SLICE OF CITRUS FRUIT AND CONTROLLING THE EXTRACTION OF JUICE THEREFROM
Rudolf H. Schlidt and Fritz K. Pauli, both of 3306 Panorama Drive SE., Huntsville, Ala.
Filed Dec. 20, 1960, Ser. No. 77,107
1 Claim. (Cl. 100—133)

This invention relates to the extraction of juice from citrus fruit, and more particularly to a device for sanitarily handling and extracting the juice from a half-slice of a citrus fruit, such as a lemon or the like.

It can be safely assumed that millions of glasses of iced tea are prepared and consumed during the course of a year in the United States alone. In a good part of this total consumption, the glass of iced tea is prepared and served with a half-slice of lemon impaled on the glass. This practice is particularly prevalent in commercial eating establishments. Anyone who has consumed iced tea so prepared has experienced the difficulties involved in getting the juice from the half-slice of lemon into the tea. The half-slice of lemon is usually of relatively thin, uniform thickness and is in the shape of a semi-circle, the arcuate periphery being defined by the rind or peel of the lemon and the straight periphery being defined by the juice-laden pulp. The usual manual procedure for extracting the juice from such a portion of lemon is to grasp the ends of the rind between the thumb and one or more fingers and to squeeze the same together. This procedure usually results in the pulp buckling, rather than simply compressing to release the juice as the thumb and fingers are moved together. This buckling of the pulp produces two results, first, it tends to squirt the juice in a direction other than toward the glass (usually in the eye, as is well-known), and second, disposes the main body of the pulp in a position so that it can not be compressed through manipulation of the rind. Thus, while the half-slice shape of the lemon presents the most pleasing appearance and is more readily capable of being impaled on the glass than other shapes, the extraction of the juice in this form usually results in the juice getting all over the thumb and fingers of the user and possibly being squirted over clothing and in the eye.

Of course, the use of citrus fruit in half-slice form is not restricted to lemons with iced tea, and the same problems indicated above are present in any situation where it is desired to squeeze the juice from a half-slice of citrus fruit so that it will be directed to a particular location.

Accordingly, it is an object of the present invention to provide a device which not only serves as a means for extracting the juice from a half-slice of a citrus fruit in a controlled manner but provides as well a means for sanitarily handling the half-slice of citrus fruit.

Another object of the present invention is the provision of a simple, inexpensive jacket for receiving a half-slice of a citrus fruit so that the latter can be conveniently handled in a manner which precludes unsanitary contamination of the citrus fruit and a controlled extraction of the juice thereof.

Another object of the present invention is the provision of a jacket of the type described which is operable to effect extraction of the juice of a half-slice of citrus fruit in a sanitary manner by a manual pinching action to the juice-laden pulp of the half-slice of citrus fruit in a direction parallel with the thickness thereof, rather than in a direction perpendicular to the thickness thereof.

Still another object of the present invention is the provision of a citrus fruit half-slice jacket of the type described having an exterior surface which is capable of presenting the half-slice of citrus fruit in a manner which either enhances the appearance thereof, displays the natural appearance thereof or affords the user the opportunity of presenting a message theron, such as advertising.

Still another object of the present invention is the provision of a citrus fruit half-slice jacket of the type described which is sufficiently economical to produce that it may be disposed of after a single use.

Still another object of the present invention is the provision of a combination citrus fruit half-slice and jacket therefor which can be easily mounted on a beverage glass, which is attractive in appearance, sanitary to handle, and effective to provide for the controlled extraction of the juice into the glass.

These and other objects of the present invention will become more apparent during the course of the following detailed description and appended claim.

The invention may best be understood with reference to the accompanying drawings wherein an illustrative embodiment is shown.

In the drawings:

FIGURE 1 is a perspective view of a glass of iced tea or the like having a jacketed half-lemon slice, embodying the principles of the present invention, mounted thereon;

FIGURE 2 is a plan view of the jacket with the walls thereof folded back out of operative position;

FIGURE 3 is a side elevational view of the jacket with a half-slice of lemon mounted therein in operative position;

FIGURE 4 is a vertical sectional view of the structure shown in FIGURE 3;

FIGURE 5 is a bottom view of a modified form of jacket embodying the principles of the present invention, showing the same with a half-slice of lemon mounted in operative position thereon; and FIGURE 6 is a cross-sectional view taken along the line 6—6 of FIGURE 5.

Referring now more particularly to the drawings, there is shown in FIGURE 1 a preferred embodiment of the present invention in the form of a jacketed half-slice of lemon, generally indicated at 10, mounted on a beverage glass, generally indicated at 12, such as a glass of iced tea or the like. The jacketed half-lemon slice 10 includes a half-slice of lemon 14 which has the usual semi-circular outer rind portion 16 and inner membrane portion 18. The half-slice is preferably of relatively thin, uniform thickness and also includes a main semi-circular body of juice-laden pulp 20, the latter defining a straight peripheral surface 22 of the half-slice. It will be understood that while the drawings illustrate a half-slice of lemon, the invention is equally applicable to half-slices of other types of citrus fruits, such as oranges, limes and the like.

The half-slice of lemon 14 is mounted within a jacket, generally indicated at 24. The jacket 24 may be made of any suitable material such as paper, cardboard, plastic, rubber or the like, a preferred material being polyethylene. The jacket essentially includes a pair of opposed walls 26 and 28 which are adapted to engage opposite surfaces of the half-slice of lemon. The walls preferably should be made of a material which is flexible and liquid-impervious. In addition to the walls 26 and 28, the jacket also essentially includes one or more openings, indicated at 30 and 32 in FIGURES 1–4, disposed adjacent the surface 22 of the half-slice of lemon to permit passage of the juice extracted from the pulp 20 therethrough.

In the embodiment of the jacket 24 shown in FIGURES 1–4, the walls 26 and 28 are interconnected adjacent their straight edges by an integral connecting portion 34 within which the openings 30 and 32 are formed. The opening 30 is preferably disposed adjacent the center of the interconnecting portion 34 and extends into the adjacent portion of the walls 26 and 28 to form a slot for receiving the edge of a beverage glass in the manner indicated in FIGURE 1. Of course, the opening 30 also serves to permit passage of the juice from the half-slice 14 into the glass in use, as do the openings 32. As shown, the openings 32 are circular in shape and are disposed in staggered relation within the interconnecting portion 34 on opposite sides of the central opening.

The arcuate peripheral edges of the opposed walls 26 and 28 are provided with inwardly-directed semi-circular flanges 36 and 38 respectively which serve to engage the outer periphery of the rind 16 and thus retain the half-slice of lemon 14 within the jacket.

Preferably, the interior surfaces of the walls 26 and 28 are provided with staggered ridges or corrugations 40 and 42. As shown, these corrugations are in the form of elongated angular ribs extending in a direction parallel with the interconnecting portion 34. These corrugations serve to strengthen the walls 26 and aid in the extraction of the juice from the pulp 20. It will be understood that the exact configuration of the serrations as shown is merely exemplary and that various modifications may be utilized. For example, the serrations could extend in a direction perpendicular to the interconnecting portion 34 or they could be intermeshing pyramids or of round, dome-like configuration.

The jacket itself is susceptible of many variations within the scope of the present invention. In FIGURES 5 and 6 there is shown a jacket 44 which includes opposed walls 46 and 48. In this embodiment the two walls are shown as being of uniform thickness and interconnected along their semi-spherical circular edges by an interconnecting portion 50. Preferably, the interconnecting portion 50 is angular or arcuate in cross-section so as to permit the two walls 46 and 48 to be more readily moved together. That is, the interconnecting portion 40 may readily buckle outwardly in response to the movement of the walls 46 and 48 together. In the embodiment shown in FIGURES 5 and 6 the interconnecting portion 50 terminates adjacent the straight edges of the walls 46 and 48 so as to define with the straight edges of the walls an opening 52 for the passage of juice, which is substantially equal in area to the area of the half-slice of lemon along the surface 2. Preferably, inwardly directed flange portions 54 and 56 respectively are formed in the walls 46 and 48 to retain the half-slice of lemon within the jacket. As before, a pair of aligned slots 58 and 60 are formed in the central portion of the flanges and adjacent walls so as to provide a means for mounting the jacket on a glass in the manner shown in FIGURE 1.

It is contemplated that the jacket of the present invention would find particular applicability in large eating establishments. The jackets is of such simple construction that it could be readily made of a molded plastic at economies sufficient to enable the owner of the establishment to dispose of the jacket after one use. In such cases, the jacket could be utilized in conjunction with machines capable of cutting the lemons into half-slices and insert the half-slices into the jackets. Such machines could be either wholly manually operated, semi-automatic or completely automatic. Such an arrangement would insure a more sanitary handling of the lemon half-slices than is presently employed. The jacket is such that it could be readily made of a clear plastic material which would simply present to the user the view of a natural lemon half-slice. On the other hand, the jacket could have suitable printing thereon for advertising purposes or for any other desired purpose.

The jacket also has applicability as a re-usable device for home consumption and, in this case, the external appearance of the jacket could be made quite fancy by the application of appropriate designs or the like thereon. Moreover, the jacket is susceptible to being suitably monogrammed.

It will be seen that with a lemon half-slice disposed within the jacket as indicated in the drawings, the user need only apply a pinching action to the exterior surfaces of the walls. This pinching action compresses the pulp of the lemon half-slice in a direction parallel to the thickness thereof and thus releases the juice within the pulp. It will be noted that the jacket is such that the walls are capable of movement toward each other by such an exteriorly applied manual pinching action. Preferably the walls are made of a flexible material to permit such movement, although it will be understood that the walls may be relatively rigid and interconnected by a flexible portion permitting such movement. The embodiment shown in FIGURES 5 and 6 illustrates this type of operation with flexible walls. It will be noted that the interconnecting portion 50 is of outwardly extending angular cross-sectional configuration so that when the walls 46 and 48 are moved toward each other, the interconnecting portion will buckle out, thus readily permitting the movement of the walls.

The configuration of the interconnecting portion shown in FIGURES 5 and 6 may also be used as an aid in retaining the lemon half-slice within the jacket. For example, the interconnecting portion could be molded with an angle considerably less than that shown in the drawing so that it would tend to move the walls toward each other. When the lemon half-slice is mounted within the jacket the walls would be spread apart and because of the construction of the interconnecting portion, the walls would be urged into engagement with the flat sides of the lemon half-slice and thus frictionally retain the same within the jacket. With such a construction, the lips 54 and 56 would be optional.

The walls of the jacket are essentially liquid-impervious so as to confine the juice released from the pulp of the lemon half-slice during the squeezing action for passage outwardly through the openings adjacent the peripheral surface 22 of the slice. In this way, the jacket serves as a sanitary means for handling the lemon half-slice and for controlling the extraction of the juice therefrom. As indicated above, the squeezing action for releasing the juice is exteriorly applied to the jacket so that there is no chance that the lemon half-slice will be touched and conversely, the juice from the lemon half-slice can not get on the user's hands or be squirted in an uncontrolled manner to smart the eyes or stain clothes. This squeezing action is easier to accomplish and much more effective than the old method of pinching the ends of the rind together. With the jacket of the present invention the buckling of the pulp which often occurred in the old procedure is completely eliminated.

It will be noted that during the squeezing action the walls of the jacket and rind of the lemon half-slice positively confine the released juice so that it can only pass outwardly through the opening adjacent the peripheral surface 22.

The serrated interior configuration of the walls such as shown in FIGURES 2–4 is preferred since it materially aids in extracting the juice from the pulp. These serrations more or less pierce into the pulp and their interengagement or staggered relation permits them to be moved close together.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claim.

I claim:

A device for sanitarily handling a half-slice of citrus fruit and controlling the extraction of juice therefrom comprising a one-piece jacket shaped to receive a half-slice of a citrus fruit, said jacket providing opposed walls positioned to engage opposite sides of a half-slice of citrus fruit mounted within said jacket, said opposed walls being semicircular in shape and having opposed arcuate edges and opposed straight edges, an integral wall portion extending between said straight edges and integrally interconnecting the same, said opposed walls and said wall portions comprising a one piece body made of thin flexible material, said integral wall portion having opening means formed therein in positions disposed adjacent the peripheral surface defined by the pulp of a half-slice of citrus fruit disposed between said opposed walls, said integral wall portion comprising the bottom of said jacket and said opposed walls extending upwardly therefrom, said opening means including a centrally located slot extending transversely of said integral wall portion and upwardly into the adjacent marginal edge portions of said opposed walls for receiving the edge of a drinking glass so that the jacket and half-slice of citrus fruit mounted therein can be removably supported thereon, said opposed walls being movable toward each other by an exteriorly applied manual pinching action to compress the pulp of a half-slice of citrus fruit disposed therebetween and release the juice therefrom and being liquid-impervious to confine the juice thus released for passage through said opening means, said opposed walls having their interior citrus fruit engaging surfaces formed with ridge-like projections for irregularly piercing the pulp of the citrus fruit to facilitate compression thereof in response to said pinching action.

References Cited in the file of this patent

UNITED STATES PATENTS

| | | |
|---|---|---|
| 1,163,507 | Carroll | Dec. 7, 1915 |
| 1,809,410 | Gross | June 9, 1931 |
| 1,836,062 | Biegeleisen | Dec. 15, 1931 |
| 1,858,435 | Conlon | May 17, 1932 |
| 2,220,458 | Osterman | Nov. 5, 1940 |
| 2,707,912 | Squarcio | May 10, 1955 |
| 2,711,688 | Squarcio | June 28, 1955 |
| 2,789,496 | Turner | Apr. 23, 1957 |

FOREIGN PATENTS

| | | |
|---|---|---|
| 317,059 | Switzerland | Jan. 15, 1957 |